Oct. 13, 1959 G. K. JENSEN ET AL 2,908,868

ELECTRICAL FREQUENCY SELECTIVE CIRCUIT

Original Filed June 17, 1953

INVENTORS
GAROLD K. JENSEN
JAMES E. MC GEOGH

BY W. R. Mattby
Richard C. Reed
ATTORNEYS 2,908,868

ELECTRICAL FREQUENCY SELECTIVE CIRCUIT

Garold K. Jensen, Pinecrest, Va., and James E. McGeogh, Silver Spring, Md., assignors to the United States of America as represented by the Secretary of the Navy Original application June 17, 1953, Serial No. 362,428, now Patent No. 2,868,973, dated January 13, 1959. Divided and this application April 30, 1957, Serial No. 656,162

6 Claims. (Cl. 331—26)

(Granted under Title 35, U.S. Code (1952), sec. 266)

The invention described herein may be manufactured and used by or for the Government of the United States of America for governmental purposes without the payment of any royalties thereon or therefor.

This is a division of application Serial No. 362,428, filed June 17, 1953, Patent No. 2,868,973 granted January 13, 1959 entitled, "Decade Frequency Generator."

This invention relates in general to an electrical frequency selective circuit and in particular to a frequency selective circuit that receives an input signal having a relatively broad bandwidth and provides an output signal having an extremely narrow bandwidth.

In many electronic applications, it is often desired to select a particular sine wave component from a complex wave. In one type of frequency measuring system, for example, a reference frequency is heterodyned with a signal whose frequency is to be measured to produce a complex wave from which a predetermined frequency is selected. The selected frequency is then used to determine the frequency of the signal to be measured. The present invention may be used in such a system to select the predetermined frequency and to suppress all other components of the complex wave. While the devices in the prior art, that may accomplish the same end, require expensive components and have a comparatively low signal rejection ratio, the present invention employs conventional components to provide high adjacent signal rejection.

One object of the present invention, therefore, is to provide an improved frequency selective circuit.

Another object of the present invention is to provide a frequency selective circuit having a high rejection ratio.

Another object of the present invention is to provide a frequency selective circuit for selecting a desired component of a complex wave.

Another object of the present invention is to provide a frequency selective circuit which selects a sine wave frequency from a complex wave by virtue of an oscillator isolated from the sidebands of the complex wave but locked to the predominant component of the wave.

Other objects and advantages of the present invention will become apparent upon a careful consideration of the following detailed description when taken in conjunction with the accompanying drawings in which.

In accordance with the present invention, a complex wave that includes a predominant frequency is applied to a phase discriminator. The output of the phase discriminator is applied to a circuit that controls the operation of a frequency oscillator which in turn is coupled to the phase discriminator. In this manner, the frequency oscillator will be precisely locked to the predominant frequency in the complex wave, the output of the oscillator will have a frequency equal to the predominant frequency, and the side bands of the complex wave will be suppressed.

Figure 1:
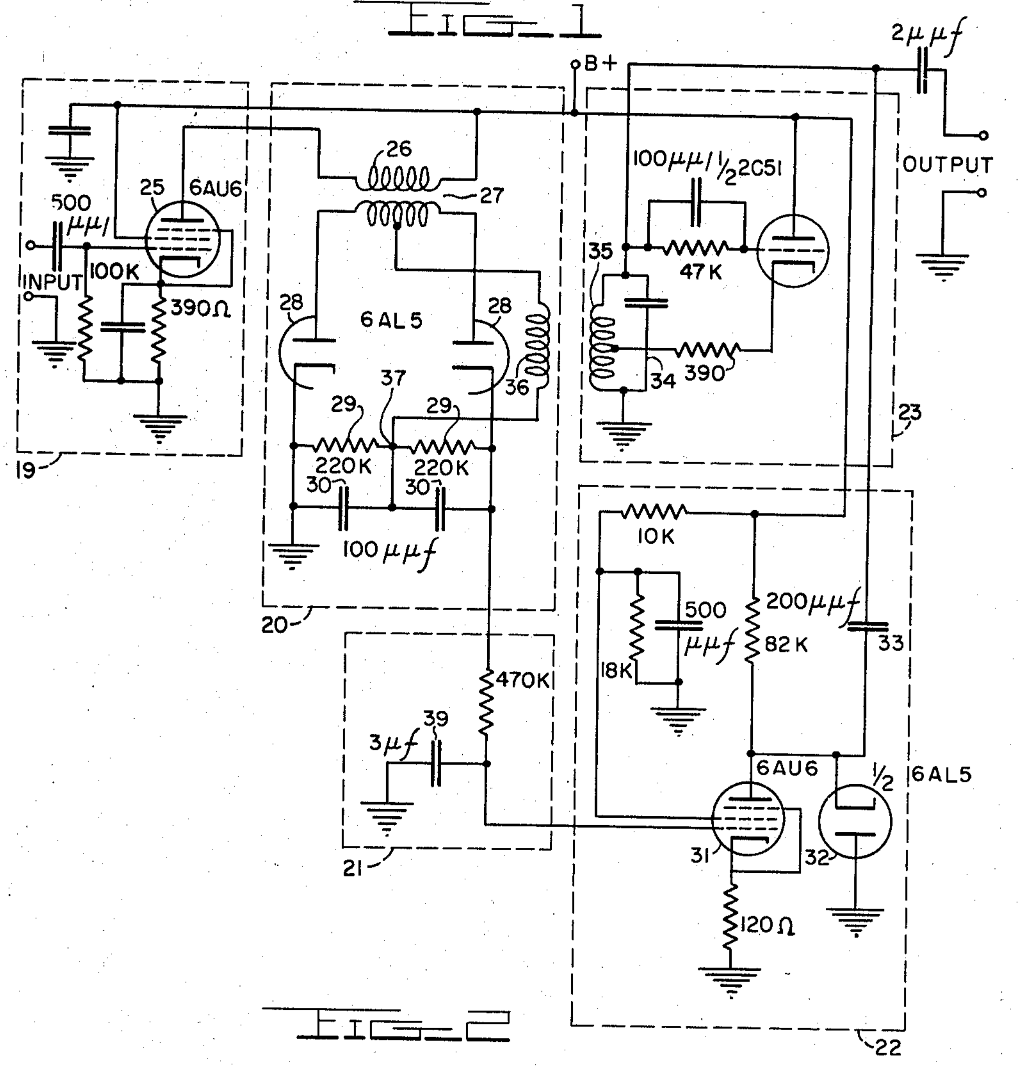
Fig. 1 is a circuit diagram of a preferred embodiment of the present invention.

Referring to Fig. 1, a complex wave is applied to the input terminals of amplifier 19. Amplifier 19 is a conventional pentode amplifier using electron tube 25 which may be a 6AU6. There is broad band inductive coupling between the amplifier 19 and phase discriminator 20 through coils 26 and 27 which permits use through a 10% range of frequencies. The extremities of coil 27 are connected to the plates of diode 28 which may be a 6AL5. A pair of shunt capacitance filters made up of resistances 29 and condensers 30 are serially connected between the cathodes of diode 28.

One of the cathodes of diode 28 is grounded and the other is connected through low pass filter 21 to the control grid of electron tube 31 which may be a 6AU6. Electron tube 31 is used in the preferred embodiment as a variable resistance device positioned across tank circuit 34 controlling the frequency thereof. To provide a wide range of anode circuit impedance, the electron tube is connected in the frequency selective circuit as a pentode and is driven below the "knee" of the pentode characteristic. The region of operation of a pentode below the "knee" of its characteristic curve is inherently accompanied by a low anode voltage which ordinarily produces complications since the oscillatory voltage developed across tank circuit 34 will have negative excursions which will have a tendency to drive electron tube 31 to cut off. If this were to occur in Fig. 1, electron tube 31 would cease conducting, effectively removing condenser 33 from the circuit during a large portion of the negative cycle of oscillatory voltage and the effect of condenser 33 on frequency variation would be eliminated. This disadvantage is avoided by diode clamp 32 which conducts during such intervals retaining condenser 33 across tank circuit 34 and permitting the embodiment disclosed to operate over a wide range of frequencies.

Coupling condenser 33 connects the plate of electron tube 31 to the tank circuit 34 of the oscillator 23. The oscillator may be any conventional oscillator and may employ one-half of a 2C51 electron tube. The coil 35 of the tank circuit 34 is coupled to the phase discriminator through coil 36. The extremities of coil 36 are connected to the midpoint of coil 27 and to terminal 37 where the two serially connected shunt capacitance filters are joined. The tank circuit 34 of the oscillator is also connected through a coupling condenser to the output terminals of the frequency selective circuit.

In considering the operation of the frequency selective circuit the effect of the predominant frequency alone will be analyzed first and then the possible interference of the sidebands will be discussed. Under the conditions of zero bias on the grid of electron tube 31, the oscillator 23 will oscillate at the middle of its frequency range. As a result two different frequencies will initially be fed into the phase discriminator, the predominant frequency of the complex wave and the oscillator frequency, unless of course, the predominant frequency equals the mid-range oscillator frequency. The output of the discriminator 20 will be a beat frequency representing the difference between the two frequencies. The alternating signal will be substantially attenuated in passing through the low pass filter 21, but it may be very small because of the cumulative effect of this signal as to cause the frequency of the oscillator to lock on the predominant frequency.

The electron tube 31 and condenser 33 are in effect in parallel with the tank circuit 34 of oscillator 23. Consequently any change in the bias on electron tube 31 changes the total impedance of that parallel branch and varies the effect of the capacitive reactance on the tank circuit. Hence an increase in grid bias on electron tube 31 increases the capacitive effect of condenser 33 on the tank circuit and reduces the frequency of oscillation of oscillator 23.

It can be easily seen that an alternating signal on the grid of electron tube 31 would frequency modulate the oscillator 23. During each cycle of modulation, only one-half of the cycle would tend to direct the oscillator more toward the predominant frequency. When the oscillator was so directed, the beat frequency output of the discriminator for that portion of the cycle would be reduced. This effect would tend to increase the duration of either the positive or negative portion of the alternating input to the low pass filter. Accordingly this increase of one portion relative to the other would tend to produce a static positive or negative charge on condenser 39 of the low pass filter. This charge would be cumulative tending to bias the grid of electron tube 31 more toward the ultimate D.C. bias necessary to lock the oscillator frequency with the predominant frequency.

Figure 2:
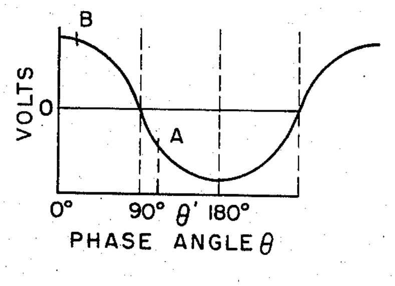
Fig. 2 is a characteristic curve of the phase discriminator shown in Fig. 1.

Figure 2 shows the characteristic curve of the phase discriminator for conditions existing after frequency lock between the oscillator and the predominant frequency. The phase discriminator output is plotted against phase relation between the two input frequencies. Thus the discriminator will supply some D.C. voltage to the electron tube dependent on the phase difference between the two frequencies. If the predominant frequency is higher than the midband frequency of which the oscillator is designed, a negative bias will be required by the electron tube 31 to lock the frequencies. It was explained above how the cumulative charging of condenser 39 would produce this negative bias which may be shown by point A on the curve of Figure 2. When the negative bias is reached, the frequencies will be equal but out of phase by $\theta'$ as shown in Figure 2 and hence they will produce no beat frequency but only the negative bias.

Once the locked frequency condition has been achieved the sideband frequencies are sufficiently attenuated by the low pass filter 21 that they have a negligible effect on the electron tube and the oscillator. Because of the high attenuation of the sidebands, they represent a very small alternating signal compared to the relatively large D.C. bias. As a result the largest effect which could be produced would be a slight oscillation of the operating point A along the characteristic curve. Thus the output of the frequency selective circuit will be essentially free of sidebands and distortion and will be precisely locked to the predominant frequency of the complex wave input signal.

Although certain specific embodiments of this invention have been disclosed and described it is to be understood that they are merely illustrative of this invention and modifications may, of course, be made without departing from the spirit and scope of the invention as defined in the appended claims.

What is claimed is:

1. In a frequency selective circuit, a phase discriminator having an output circuit and first input termials and second input terminals, a source of input signals, means connecting said first input terminals to the source of input signals, a variable frequency oscillator having a frequency determinative circuit, means coupling said second input terminals to the frequency determinative circuit, an electron tube having at least an anode, cathode and control element, means connecting said control element to said output circuit, a unilateral impedance device, means for connecting the unilateral impedance device in shunt with said electron tube, a reactive impedance element, and means connecting the reactive impedance element between said anode and said frequency determinative circuit.

2. In a frequency selective circuit, a phase discriminator having an output circuit and first input terminals and second input terminals, a source of input signals, means connecting said input terminals to the source of input signals, a variable frequency oscillator having a frequency determinative circuit, means connecting said second input terminals to the frequency determinative circuit, a reactive impedance element, means connecting said reactive impedance element to the frequency determinative circuit, a unilateral energy flow variable resistance device connected in series with said reactive impedance element for controlling the energy flow in said reactive impedance element, means for connecting the unilateral energy flow variable resistance device to the output circuit of said phase discriminator, and a unilateral energy flow impedance element connected across said unilateral energy flow variable resistance device and polarized to conduct energy in the direction opposite to that conducted by said unilateral energy flow variable resistance device.

3. In a frequency selective circuit, a phase discriminator having an output circuit and first input terminals and second input terminals, a source of input signals, means connecting said first input terminals to the source of input signals, a variable frequency oscillator having a frequency determinative circuit, means connecting said second input terminals to the frequency determinative circuit, an electron tube having at least an anode, cathode and control element, means connecting said control element to said output circuit, a unilateral impedance device, means for connecting the unilateral impedance device in shunt with said electron tube and polarized to conduct current in a direction opposite to that conducted by the electron tube, a reactive impedance element, and means connecting said reactive impedance element between said anode and said frequency determinative circuit.

4. In a frequency selective circuit, a phase discriminator for providing a direct current signal and having first input terminals and second input terminals, a source of input signals, means connecting said first input terminals to the source of input signals, a variable frequency oscillator having a frequency determinative circuit, means connecting said second input terminals to the frequency determinative circuit, a variable resistance device having a control element, means connected between the control element and the output of said phase discriminator for substantially eliminating alternating current signals in the output of the phase discriminator and for maintaining said control element at a potential level in dependency on said direct current signal, a unilateral impedance device connected in shunt with said variable resistance device, a reactive impedance element, means connecting said reactive impedance element between the variable resistance device and the frequency determinative circuit, an output circuit, and means for connecting said output circuit to said frequency determinative circuit.

5. In a frequency selective circuit, a phase discriminator for providing a direct current signal and having first input terminals and second input terminals, a source of input signals, means connecting said first input terminals to the source of input signals, a variable frequency oscillator having a frequency determinative circuit, means connecting said second input terminals to the frequency determinative circuit, means including an electron tube having at least an anode, a cathode, and a control element for controlling the variable frequency oscillator in dependency on said direct current signal, means connected between the control element and the output of said phase discriminator for substantially eliminating alternating current signals in the output of the phase discriminator and for maintaining said control element at a potential level in dependency on the direct current signal, a reactive impedance element, means connecting said reactive impedance element between the anode and the frequency discriminative circuit, a unilateral impedance device connected in shunt with said electron tube and polarized to conduct current in a direction opposite to that conducted by the electron tube an output circuit, and means connecting said output circuit to the frequency determinative circuit.

6. In a frequency selective circuit, a phase discriminator for providing a direct current signal and having first input terminals and second input terminals, a source of input signals, means for connecting said first input terminals to the source of input signals, a variable frequency oscillator having a frequency determinative circuit, means for connecting said second input terminals to the frequency determinative circuit, a reactive impedance element, means for connecting the reactive impedance element to the frequency determinative circuit, a unilateral energy flow variable resistance device having a control element connected in series with said reactive impedance element, means connected between the control element and the output of said phase discriminator for substantially eliminating alternating current signals in the output of the phase discriminator and for maintaining said control element at a potential level in dependency on the direct current signal, a unilateral energy flow impedance element, means for connecting said unilateral energy flow impedance element across said unilateral energy flow variable resistance device and polarized to conduct energy in the direction opposite to that conducted by said unilateral energy flow variable resistance device, an output circuit, and means for connecting said output circuit to the frequency determinative circuit.

References Cited in the file of this patent

UNITED STATES PATENTS

| | | |
|---|---|---|
| 2,623,177 | Hugenholtz | Dec. 23, 1952 |
| 2,762,917 | Sharin et al. | Sept. 11, 1956 |

OTHER REFERENCES

"The Impulse-Governed Oscillator, a System for Freq. Stabilization" in Philips Technical Review by E. H. Hugenholtz, vol. 14, No. 5 (1952), pages 130–132.